United States Patent [19]

Amos et al.

[11] Patent Number: 4,881,677
[45] Date of Patent: Nov. 21, 1989

[54] EXOTHERMIC WELDING APPARATUS INCLUDING A BAFFLE COVER ASSEMBLY

[75] Inventors: Michael D. Amos, Burton; Denis A. Brosnan, Solon; Mark V. Samas, Euclid; Richard E. Singer, Beachwood; James E. Whetsel, Bedford; David P. Kovarik, Eastlake, all of Ohio

[73] Assignee: Erico International Corporation, Solon, Ohio

[21] Appl. No.: 237,080

[22] Filed: Aug. 29, 1988

Related U.S. Application Data

[63] Continuation-in-part of Ser. No. 128,597, Dec. 4, 1987, which is a continuation-in-part of Ser. No. 30,169, Mar. 25, 1987, abandoned.

[51] Int. Cl.$^4$ .............................................. B23K 23/00
[52] U.S. Cl. ...................... 228/33; 228/198; 228/241; 164/54; 266/167
[58] Field of Search ............... 228/198, 241, 33, 56.1, 228/57; 164/53, 54, DIG. 12; 266/144, 167

[56] References Cited

U.S. PATENT DOCUMENTS

| | | | |
|---|---|---|---|
| 1,178,325 | 4/1916 | Lang | 164/DIG. 12 |
| 1,838,357 | 12/1931 | Bottrill | 266/167 |
| 2,462,256 | 2/1949 | Charman et al. | 164/123 |
| 2,821,000 | 1/1958 | Nouveau | 164/53 |
| 3,166,805 | 1/1965 | Fritz et al. | 164/53 |
| 3,933,191 | 1/1976 | Adams et al. | 164/54 |
| 3,984,044 | 10/1976 | Breton et al. | 228/198 |

FOREIGN PATENT DOCUMENTS 324534  4/1903  France .............................. 228/241

Primary Examiner—Nicholas P. Godici
Assistant Examiner—Samuel M. Heinrich
Attorney, Agent, or Firm—Renner, Otto, Boisselle & Sklar

[57] ABSTRACT

An improved thermite reaction containment vessel and method of using the same includes a crucible in which the exothermic material is contained and which is connected at its lower end via a tap hole to a weld chamber in which the parts to be welded are positioned. On top of the crucible is positioned a baffle assembly which includes a plurality of expansion chambers which allows the escaping gas to expand and be reduced in velocity. As the gases move from one expansion chamber to the next the gases change direction. The expansion, direction change and the large surface area of the baffle assembly allows the gases to slow and cool before being exhausted leaving behind molten metal spatter or flame and greatly reducing the amount of smoke exhausted since particulate matter is accumulated on the baffle interior surface. Several forms of baffle assembly are disclosed using inverted stacked metal cups. The baffle assembly may be used in conjucntion with a filter assembly and remote electrical ignition or without a filter assembly and conventional starting material, with such matrial being ignited through the top of the baffle assembly.

43 Claims, 2 Drawing Sheets

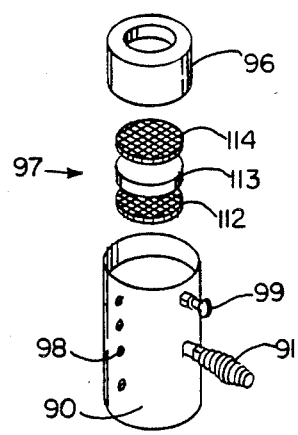
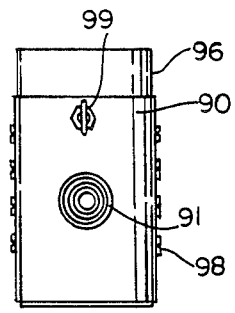
FIG. 8
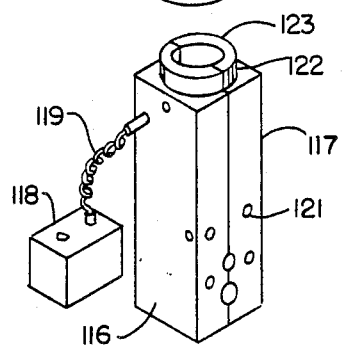
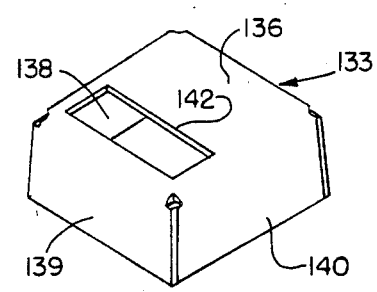
FIG. 9
FIG. 10
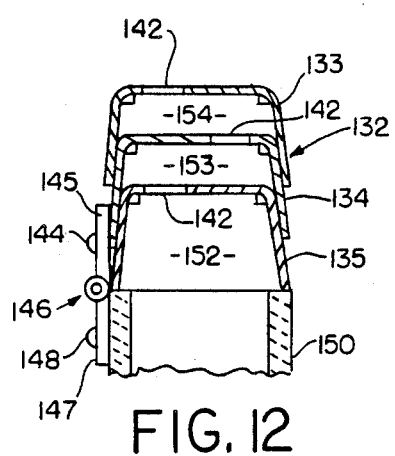
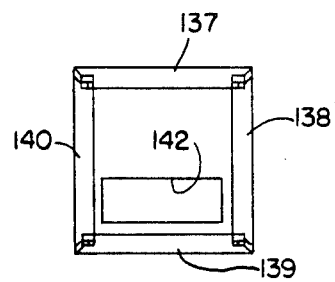
FIG. 12
FIG. 11

EXOTHERMIC WELDING APPARATUS INCLUDING A BAFFLE COVER ASSEMBLY

RELATED APPLICATION

This application is a continuation-in-part of application Ser. No. 128,597 entitled "Exothermic Welding Apparatus and Method", filed Dec. 4, 1987, which in turn is a continuation-in-part of application Ser. No. 030,169 entitled "Exothermic Welding Apparatus and Method", filed Mar. 25, 1987, now abandoned.

This invention relates to exothermic reactions. More particularly, this invention relates to an improved apparatus and method for producing molten metal such as weld metal for joining two or more members utilizing a thermite reaction to produce the molten metal.

BACKGROUND

Thermite reactions are highly exothermic reactions. During such reactions initially solid reactants undergo oxidation and reduction processes which liberate heat and form reaction products. Such thermite reaction processes serve various useful purposes. Important applications of the thermite reaction process include the welding of metallic members and the cast forming of metal or ceramic parts. In such applications the thermite reaction is utilized to produce a superheated molten metal to cast a part or produce a weld metal for the welding and joining of the members.

Thermite reactions are generally described as reactions between metal oxides and metallic reducing agents. The metal oxides chosen for the reaction are those which have low heats of formation. The reducing agents chosen for the reaction are those which exhibit oxide species with high heats of formation. The difference in the heat of formation of the reaction product metal oxide and the reactant metal oxide is the heat produced in the reaction, and, as indicated, such reaction are highly exothermic. Thermite reactions of particular interest due to their extensive industrial usage are as follows:

|     | Thermite Reactions | Heat Evolved K cal |
| --- | --- | --- |
| (1) | $3Fe_3O_4 + 8Al = 9Fe + 4Al_2O_3$ | 719 |
| (2) | $3FeO + 2Al = 3Fe + Al_2O_3$ | 187 |
| (3) | $Fe_2O_3 + 2Al = 2Fe + Al_2O_3$ | 181 |
| (4) | $3CuO + 2Al = 3Cu + Al_2O_3$ | 275 |
| (5) | $3Cu_2O + 2Al = 6Cu + Al_2O_3$ | 260 |

In present commercial form the thermite reactions noted above all require local temperatures of approximately 1750° F. in order to be self-propagating (i.e., in order to ignite and continue the reaction to completion). For this reason, starting materials of lower ignition temperatures (about 850° F.) are placed in direct contact with the thermite reaction materials. Such starting materials may be conveniently ignited with a flint igniter, or other like sparking or ignition device. Upon ignition of the starting material, the starting material serves to ignite the higher temperature ignition point thermite reaction materials.

Thermite reactions are generally conducted in a reaction containment vessel such as a crucible. Upon ignition of the thermite reaction materials significant amounts of hot gases containing smoke and fume evolve from the reaction containment vessel. Such smoke and fume generally includes particulate matter.

When an exothermic reaction occurs, high temperatures are reached in a very short period of time thus causing the surrounding air to expand and flow upwardly out of the vessel or crucible where the reaction takes place. Along with this sudden upward rush of hot gases there is, in addition to flame and spatter, a considerable amount of particulate matter in the form of dust or smoke. Simply to plug the exhaust exits would cause pressure build-up in the vessel or crucible which would then force unreacted exothermic material or slag into the weld chamber or force molten weld metal out of the part receiving holes, or in a multi-part mold, cause separation of the parts, all of which is unacceptable.

Accordingly it is desirable to reduce the amount of particulate emissions, flame and spatter exiting the apparatus during the exothermic process while avoiding excessive pressure build-up.

SUMMARY OF THE INVENTION

An improved thermite reaction containment vessel and method of using the same includes a crucible in which the exothermic material is contained and which is connected at its lower end via a tap hole to a weld chamber in which the parts to be welded are positioned. On top of the crucible is positioned a baffle assembly which includes a plurality of expansion chambers which allows the escaping gas to expand and be reduced in velocity. As the gases move from one expansion chamber to the next the gases change direction. The expansion, direction change and the large surface area of the baffle assembly allows the gases to slow and cool before being exhausted leaving behind molten metal spatter or flame and greatly reducing the amount of smoke exhausted since particulate matter is accumulated on the baffle interior surface.

Several forms of baffle assembly may be used depending on the type of exothermic welding being done and the size of the apparatus. In one form the baffle assembly includes separable metal frames which may be locked together and positioned on top of a crucible. Graphite or refractory plates are mounted in the frame to form horizontal baffle plates when the frame parts are jointed with the plates forming expansion chambers of large surface area and providing interconnecting yet laterally offset gas restricting passages from chamber to chamber. The separation of the frame parts enables starting material to be placed on each plate prior to closure to permit the process to be ignited or started from the top of the baffle assembly.

In another form the baffle assembly may be formed of graphite or refractory disks secured in a cylindrical frame or stacked one on top of the other, each disk having an elongated opening offset toward the outer circumference with each alternate opening being oppositely offset.

For smaller welding apparatus the baffle assembly may be formed of inverted stacked sheet metal cups with offset holes in the horizontal plate portions. Each cup is provided with a slightly flaring skirt so that they may be stacked one on top of the other and tack welded together to form the assembly which may then be hinged to the top of the crucible.

The baffle assemblies may be used in conjunction with a filter assembly and remote electrical ignition, or with conventional starting material.

The foregoing and other features of the invention are hereinafter more fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 8 is an elevation of the assembly of FIG. 6 seen from the righthand side of FIG. 6 or the bottom of FIG. 7;

FIG. 9 is an exploded view of the assembly of FIG. 8 and a crucible showing remote electrical ignition;

FIG. 10 is a perspective view of an inverted metal cup which may be used to form another type of baffle assembly;

FIG. 11 is a bottom plan view of the cup of FIG. 9; and

FIG. 12 is a vertical section of a baffle assembly formed of the cups of FIGS. 9 and 10 and hinged to the top of a crucible.

DETAILED DESCRIPTION OF THE PREFERRED EMBODIMENTS

Figure 1:
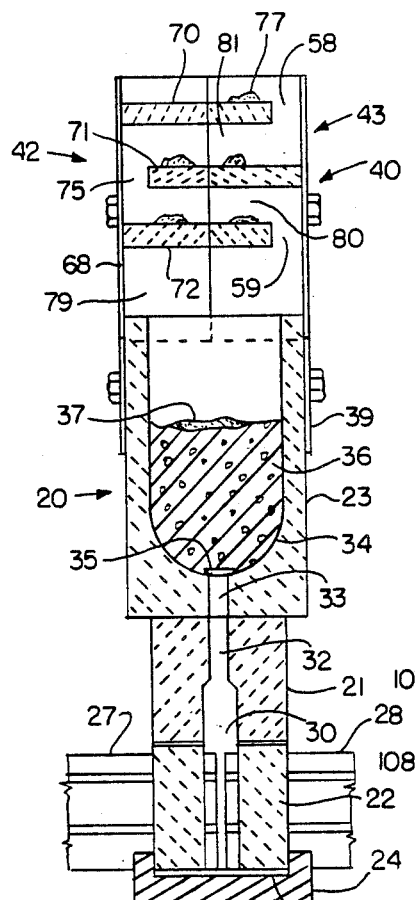
FIG. 1 is a vertical section through apparatus for exothermic welding of relatively large parts such as third rails and showing a baffle assembly on top of the crucible.

Referring first to FIG. 1 there is illustrated exothermic welding apparatus in accordance with the present invention shown generally at 20. The apparatus includes a series of assembled and clamped graphite blocks with the lower blocks 21 and 22 forming the mold while the upper blocks 23 form the crucible. The entire assembly rests on a bottom plate 24 with the mold blocks 22 being supported thereon. Refractory batting is interposed between the bottom plate and the bottom mold blocks 22 as indicated at 25. The bottom blocks 22 receive parts 27 and 28 to be welded which are positioned with their ends slightly spaced in weld chamber 30. The parts illustrated are, for example, conductive third rails for a transit system.

Both the blocks 21 and the crucible 23 are provided with aligned passages seen at 32 and 33 which form a tap hole providing communication between the crucible chamber 34 and the weld chamber 30. The bottom of the crucible chamber 34 at the tap hole passage 33 is closed with a metal disk 35 and the crucible chamber is filled with exothermic welding material indicated at 36. Positioned on top of the exothermic welding material is a starting material 37.

As indicated in FIG. 1 the refractory or graphite blocks of the crucible include a metal frame 39 to which the toggle clamps holding the opposed parts of the crucible together are secured.

Positioned on top of the crucible and supported by the metal frame is a baffle assembly shown generally at 40. As seen also in FIGS. 2, 3 and 4 the baffle assembly includes two separable halves or parts 42 and 43 which together form the baffle assembly. The baffle assembly part or half 43 is shown in FIGS. 2 and 3 while the baffle assembly part 42 is seen in FIG. 4.

Figure 2:
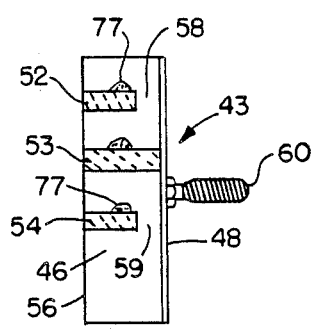
FIG. 2 is a vertical section showing half of the baffle assembly.
Figure 3:
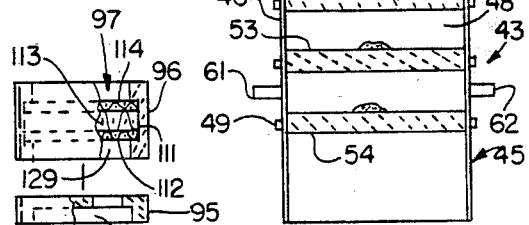
FIG. 3 is an elevation of the part seen from the left-hand side of FIG. 2.
Figure 4:
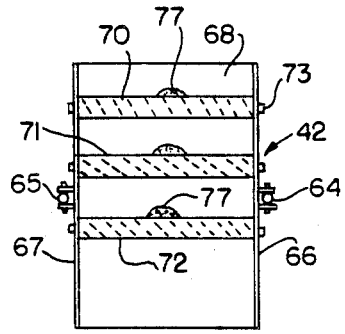
FIG. 4 is a similar view of the other part of the baffle assembly.

With reference to FIGS. 2 and 3 the baffle assembly part includes a vertically extending channel shape metal frame 45 which includes relatively narrow side walls 46 and 47 and a wider interconnecting wall 48. Secured by suitable fasteners 49 through the walls 46 and 47 are refractory or graphite horizontal plates seen at 52, 53 and 54. Such plates are vertically spaced and the edge of each plate is flush with the projecting edges 56 of the side plates 46 and 47. The middle plate 53 extends completely to the outside wall 48 while the top and bottom plates 52 and 54 do not, leaving a slight gap as indicated at 58 and 59 in FIG. 2. The gap extends from one side wall 46 to the opposite side wall 47. The exterior of the outside or interconnecting plate 48 is provided with a handle 60 as seen in FIG. 2 and the side walls are provided with lugs 61 and 62 as seen in FIG. 3. Both halves of the baffles assembly may be provided with such handles which for ease of illustration are removed in FIG. 1. The lugs 61 and 62 on the baffle half 43 cooperate with toggle clamps 64 and 65 on the side walls 66 and 67, respectively, of the baffle half 42 seen in FIG. 4.

Like the baffle half 43 the baffle half 42 includes the channel shape frame made up of the side walls 66 and 67 and the interconnecting outside wall 68 with horizontal vertically spaced refractory or graphite plates 70, 71 and 72 being secured to the side walls by fasteners 73. Also as seen in FIG. 1 the top and bottom plates 70 and 72 extend flush with the projecting edge of the side walls 66 and 67 to the interconnecting outside wall 68 while the middle plate extends only from such projecting edges to a position spaced from the outside wall 68 leaving a gap 75 which is the same configuration as the gaps 58 and 59. It is noted that when the two halves of the baffle are assembled the configuration presented is square or rectangular which is the same configuration as the top of the crucible. The two assembled halves may be simply telescoped over the top of the crucible to rest upon the frame 39.

Prior to assembling the baffle parts, a small amount of starting material may be deposited on each horizontal plate as seen at 77. The ignition of the starting material on the uppermost plate will cause a chain reaction igniting the starting material on each successively lower plate which ignited material then drops onto the starting material 37 commencing the exothermic reaction. As the exothermic reaction proceeds in conventional fashion the molten metal formed will reach the disk 35 and when the disk fuses the molten metal will drop into the weld chamber 30. Any slag formed during the process rises to the top prior to the fusion of the disk and is not drawn into the weld cavity. The process happens quickly of course and any flame, spatter or fumes must pass through the baffle assembly to exit at the top. Such gases and fumes pass from the initial fairly large expansion chamber 79 through restricted passage 59 into expansion chamber 80, then through restricted passage 75 into expansion chamber 81 and finally exit through restricted passage 58.

Figure 5:
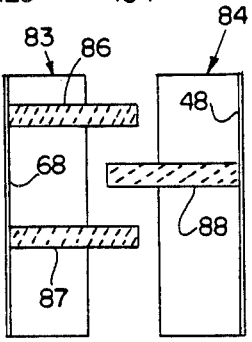
FIG. 5 is a vertical section showing two parts of a baffle assembly where each alternating baffle plate is of one-piece construction.

In the embodiment of FIGS. 1-4 the horizontal plates and the baffle halves abut each other and form in effect a continuous plate when the baffle halves are jointed. In the embodiment of FIG. 5 the two baffle halves 83 and 84 again include a metal channel shape frame but the baffle half 83 includes two rather widely spaced graphite or refractory horizontal plates 86 and 87 while the baffle half 84 includes a single plate 88 which is positioned to fit midway between the plates 86 and 87 when the halves are assemblied. Each plate projects beyond the edges of the side walls of the frame but to an extent to be spaced from the interconnecting walls or outside walls 68 and 48, respectively, such spacing providing the same restricted offset openings, 59, 75 and 58 as seen in FIG. 1. The ability to separate the two baffle halves againn enables starting material to be placed on the horizontal plates so that the process may be ignited from the top of the baffle as in FIG. 1. The baffle assembly is otherwise the same as that shown in FIGS. 1-4 and fits on top of the crucible in the same manner.

Figure 6:
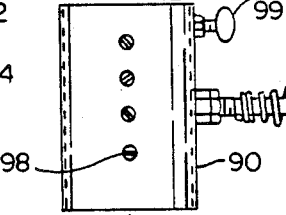
FIG. 6 is an exploded view of a baffle assembly using disks mounted in a frame.
Figure 7:
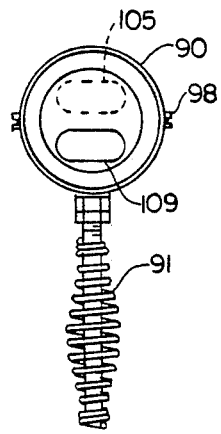
FIG. 7 is a top plan view of the assembly of FIG. 6 with the filter assembly removed.

Referring now to FIGS. 6, 7, 8 and 9 there is illustrated another embodiment of a baffle assembly in accordance with the present invention. Referring first to FIGS. 6, 7 and 8 it will be seen that the baffle assembly includes a cylindrical frame or housing 90 which includes a removable projecting handle 91. Mounted within the housing is a bottom baffle plate 92, intermediate baffle plates 93 and 94, a top baffle plate 95, and above the top baffle plate a housing 96 for filter assembly 97. Each of the baffle plates may be held in position by the fasteners indicated at 98 while the filter housing 96 is held in position by thumb screw 99. Each of the baffle plates and the filter housing are made of refractory material such as graphite. The housing 90 is metal.

Referring initially to the bottom baffle plate 92 it will be seen that such a baffle plate includes a top wall 102 and a peripheral depending skirt 103 with the interior lower edge thereof being tapered as indicated at 104. The top plate 102 is provided with a radially offset elongated opening 105 having the profile configuration seen more clearly in FIG. 7. Each of the baffle assemblies 93, 94 and 95 is provided with a top wall 107, a relatively short skirt 108 and a radially offset opening 109 in such top wall. As indicated, the baffle plates are arranged so that the openings 105 and 109 are alternately offset from the axis of the assembly on opposite sides.

The filter assembly 96 includes a cylindrical sleeve of refractory material which includes an internal channel 111, layers of different types of filter material as indicated at 112, 113 and 114. The filters 112 and 114 are primary filters and may comprise a graphite felt. The thicker secondary filter layer 113 when sandwiched therebetween may comprise a ceramic fiber blanket material. The bottom layer 112 protects the intermediate layer 113 from spatter and heat degradation while the top layer acts as containment for the layer 111. Such filters are generally reusable and depending upon the particular application they may be used to perform several cycles or ignitions of the vessel or crucible. Such filters are easily replaced by removing them from the holder 96 and inserting new filters. Also, after several cycles, the baffle assembly, either embodiment, may easily be disassembled and cleaned with a suitable solvent.

Because of the use of the filter assembly, it is not possible to ignite the exothermic material through the use of starting material from the top of the baffle assembly. Therefore, as seen in FIG. 9 the exothermic material in the crucible chamber of the mold parts 116 and 117 is ignited electrically from an external power source 118 through lead 119. Remote electrical ignition may be obtained in a variety of ways, examples being seen in copending application Ser. No. 128,597, filed Nov. 28, 1987, entitled "Exothermic Welding Apparatus And Method", copending application Ser. No. 177,075, filed Mar. 2, 1988, entitled "Exothermic Welding Apparatus And Method", and copending application Ser. No. 177,076, filed Apr. 4, 1988, entitled "Exothermic Welding Apparatus And Method".

The mold blocks 116 and 117 may be held together by suitable toggle clamps which fit within the holes seen at 121 and when held together form the crucible, tap hole and weld chamber. The top of the mold blocks is provided with two semicircular projections forming an annular ridge or chimney 122, the outer top edge of which may be tapered to receive the tapered inner edge of the bottom baffle plate 92.

When the exothermic material is ignited, the gases will expand into a first somewhat enlarged chamber formed by the top of the crucible and the bottom of the lower baffle plate 92 as indicated at 125 in FIG. 6. The gases then pass through the opening 105 into an expansion chamber 126, through the offset opening 109 and into expansion chamber 127, again through the offset opening and into expansion chamber 128 to exit through the offset opening in the top baffle plate into the chamber 129 in the bottom of the filter assembly, and finally to pass through the filter assembly.

Referring now to the embodiment of the invention disclosed in FIGS. 10-12 it will be seen that a baffle assembly 132 is formed of a plurality of stacked sheet metal inverted cups 133, 134 and 135.

As seen in more detail in FIGS. 10 and 11 each sheet metal cup includes a top horizontal plate which is generally square in configuratin and a skirt formed of walls 137, 138 and 140. The top plate of each cup is provided with an offset rectangular opening as seen at 142.

As seen more clearly in FIG. 12 the skirt walls extend downwardly at a slight angle from vertical so that the inverted cups may be stacked one on top of each other as illustrated with the skirt walls of the upper cup overlapping the skirt walls of the next lower cup. The skirt walls may readily be tack or spot welded together to form a unitary assembly and the assembly may be secured as at 144 to leaf 145 of hinge assembly 146. The opposite hinge leaf 147 is secured at 148 to the side wall of the top of crucible 150.

In operation, the baffle assembly 132 of FIG. 12 may be hinged out of the way of the top of the crucible 150 for loading of the crucible. When ignition occurs the baffle assembly may be flipped into the position shown with the hot gases initially expanding into the chamber 152 passing through offset hole 142 into expansion chamber 153, then passing through offset hole 142 into expansion chamber 154, and finally through alternately offset hole 142 to atmosphere.

It will be appreciated that a sheet metal baffle assembly as illustrated may take a variety of forms depending upon the type of exothermic welding apparatus employed. It will also be appreciated that, as in all embodiments, more or fewer baffle plates may be employed to form the baffle assembly.

It can now be seen that as the gases enter each level of the baffle, they are allowed to expand which reduces the velocity of the gases. The gases are then directed through an orifice to the next level changing direction. The gases not only flow through the sinuous path but from one level to the next they pass through an expansion chamber. The direction change along with the large amount of surface area by which the gases pass allows the gases time to cool before further expanding on the next level. This sequence continues until the gases have slowed and cooled enough to be exhausted, thus leaving behind weld spatter, flame, and greatly reducing the amount of smoke because the cool particulate matter has accumulated on the baffle walls. As indicated, the present invention may be used with a filter system for further smoke reduction and may be used with either remote electrical ignition or conventional ignition through the use of starting material.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the following claims.

What is claimed is:

1. Exothermic apparatus comprising a chamber, a crucible above said chamber, adapted to contain exothermic material and connected to said chamber by a tap hole, whereby when such exothermic material is ignited molten reaction products of said exothermic mixture flow through said tap hole to enter said chamber, and baffle cover means on said crucible operative to reduce the amount of smoke emitted from the crucible when the exothermic material is ignited, said baffle cover means comprising a plurality of interconnected expansion chambers reducing the velocity of the gases emitted from the crucible.

2. Apparatus as set forth in claim 1 wherein said baffle cover means comprises a frame mounted on said crucible, said frame including horizontal vertically spaced plates forming said expansion chambers.

3. Apparatus as set forth in claim 2 including gas passageways in said plates interconnecting said chambers.

4. Apparatus as set forth in claim 2 including gas passageways formed by said plates and frame interconnecting said chambers.

5. Apparatus as set forth in claim 2 wherein said plates are circular.

6. Apparatus as set forth in claim 2 wherein said frame and plates are rectangular.

7. Apparatus as set forth in claim 2 wherein said frame is hinged to said crucible.

8. Apparatus as set forth in claim 7 wherein said baffle cover means is formed of stacked inverted cup-shape members.

9. Apparatus as set forth in claim 8 wherein said cup-shape members each include a top plate and a skirt forming wall extending outwardly at a slight angle to vertical whereby said members may be stacked one on top of the other to space the top walls to form expansion chambers therebetween.

10. Apparatus as set forth in claim 9 wherein said cup-shape members each include a rectangular top plate and walls extending downwardly at a slight angle to vertical whereby said cup-shape members may be stacked one on top of the other with the respective top walls vertically spaced to form expansion chambers therebetween.

11. Apparatus as set forth in claim 2 wherein said frame includes two parts which when joined form said baffle cover means.

12. Apparatus as set forth in claim 11 wherein each part includes horizontal plates at the same level which mate when said parts are joined.

13. Apparatus as set forth in claim 11 wherein each part includes horizontal plate at different levels to interfit when said parts are joined.

14. Apparatus as set forth in claim 3 wherein said plates are spaced from said frame at alternate opposite edges to form said passageways.

15. Apparatus as set forth in claim 1 including a filter assembly mounted on said baffle cover assembly.

16. Apparatus as set forth in claim 15 wherein said filter assembly includes a primary and secondary filter.

17. Apparatus as set forth in claim 16 including remote electrical ignition means for the exothermic material.

18. Exothermic welding apparatus comprising a weld chamber adapted to contain parts to be welded, a crucible above said chamber adapted to contain exothermic material and connected to said weld chamber by a tap hole, whereby molten metal formed by ignition of said material will flow into said weld chamber, and baffle cover means on said crucible to slow and cool the gases emitted from the crucible when the exothermic material is ignited, said baffle cover means comprising at least two expansion chambers reducing the velocity of the gases emitted from the crucible.

19. Apparatus as set forth in claim 18 wherein said baffle cover means comprises a frame mounted on said crucible, said frame including horizontal vertically spaced plates forming said expansion chambers.

20. Apparatus as set forth in claim 19 including gas passageways in said plates interconnecting said chambers.

21. Apparatus as set forth in claim 19 including gas passageways formed by said plates and frame interconnecting said chambers.

22. Apparatus as set forth in claim 19 wherein said plates are circular.

23. Apparatus as set forth in claim 19 wherein said frame and plates are rectangular.

24. Apparatus as set forth in claim 19 wherein said frame is hinged to said crucible.

25. Apparatus as set forth in claim 24 wherein said baffle cover means is formed of stacked inverted cup-shape members.

26. Apparatus as set forth in claim 25 wherein said cup-shape members each include a top plate and a skirt forming wall extending outwardly at a slight angle to vertical whereby said members may be stacked one on top of the other to space the top walls to form expansion chambers therebetween.

27. Apparatus as set forth in claim 25 wherein said cup-shape members each include a rectangular top plate and walls extending downwardly at a slight angle to vertical whereby said cup-shape members may be stacked one on top of the other with the respective top walls vertically spaced to form expansion chambers therebetween.

28. Apparatus as set forth in claim 19 wherein said frame includes two parts which when joined form said baffle cover means.

29. Apparatus as set forth in claim 28 wherein each part includes horizontal plates at the same level which mate when said parts are joined.

30. Apparatus as set forth in claim 28 wherein each part includes horizontal plates at different levels to interfit when said parts are joined.

31. Apparatus as set forth in claim 20 wherein said plates are spaced from said frame at alternate opposite edges to form said passageways.

32. Apparatus as set forth in claim 18 including a filter assembly mounted on said baffle cover assembly.

33. Apparatus as set forth in claim 32 wherein said filter assembly includes a primary and secondary filter.

34. Apparatus as set forth in claim 32 including remote electrical ignition means for the exothermic material.

35. Exothermic welding apparatus comprising a weld chamber adapted to contain the parts to be welded, a crucible above said chamber adapted to contain exothermic welding material and connected to said weld chamber by a tap hole whereby when said exothermic material is ignited molten metal flow through said tap hole to enter said weld chamber to weld the parts together, the improvement comprising a baffle cover assembly on top of said crucible which includes a plurality of interconnected gas expansion chambers to reduce the amount of flame, weld spatter and smoke emitted from the crucible.

36. Exothermic welding apparatus comprising a weld chamber adapted to contain parts to be welded, a crucible above said chamber adapted to contain exothermic material and connected to said weld chamber by a tap hole whereby when such exothermic material is ignited molten metal flows through said tap hole to enter said weld chamber to weld the parts together, and plural chamber baffle cover means on said crucible operative to reduce the amount of smoke emitted from the crucible when the exothermic material is ignited.

37. A thermite reaction containment vessel for reacting thermite reaction material therein which upon ignition evolves hot gases including a baffle assembly having a plurality of plates each having an opening therein, said plates being stacked and positioned in such a manner as to provide a plural chamber baffled path through which such exhaust gases flow.

38. A containment vessel as set forth in claim 37 further including a filter assembly comprising a filter holder having filter means for further filtering such exhaust gases after such exhaust gases flow through said baffle assembly.

39. A containment vessel as set forth in claim 38 wherein said filter means comprises a pair of primary filters and a secondary filter sandwiched between said primary filters.

40. A containment vessel as set forth in claim 39 wherein said primary filters comprise graphite felt.

41. A containment vessel as set forth in claim 40 wherein said secondary filter comprises a ceramic fiber blanket material.

42. A containment vessel as set forth in claim 37 wherein said openings in said plates are elongated openings alternately offset.

43. A containment vessel as set forth in claim 42 wherein said plates are disks and are positioned such that said openings in said disks are offset 180° from one another.

* * * * *